(12) United States Patent
Bohrer et al.

(10) Patent No.: US 6,405,360 B1
(45) Date of Patent: *Jun. 11, 2002

(54) PROPERTY CONTAINER TYPE OBJECTS

(75) Inventors: Kathy Bohrer, Austin, TX (US);
Timothy Graser, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,944

(22) Filed: Sep. 11, 1997

(30) Foreign Application Priority Data

Nov. 8, 1996 (EP) .............................. 96117940

(51) Int. Cl.⁷ ................................. G06F 9/44
(52) U.S. Cl. .......................... 717/1; 709/315
(58) Field of Search ................. 709/300, 303, 709/310–332; 707/107; 717/1–10; 345/333

(56) References Cited

U.S. PATENT DOCUMENTS 5,603,031 A * 2/1997 White ....................... 709/317
5,613,099 A * 3/1997 Erickson et al. ............ 395/500
5,623,657 A * 4/1997 Conner et al. .............. 709/303

OTHER PUBLICATIONS

SOMobjects Developer Toolkit Users Guide ver 2.0, IBM, Jun. 1993, p. 7–1–7–7.*

* cited by examiner

Primary Examiner—St. John Courtenay, III
(74) Attorney, Agent, or Firm—Owen J. Gamon; Roy W. Truelson

(57) ABSTRACT

A framework being used for developing software system e.g. for a business application. This framework includes a number of object oriented classes which may be processed by a computer system. The invention provides an interface and a base class which implements this interface that allows specific data to be added to the objects of classes supporting the interface at runtime without the need for subclassing of the original class. Specific data added in this way to an object are referred to as properties of the object, and the interface introduced by this invention is referred to as the property container interface.

6 Claims, 3 Drawing Sheets

FIG. I (PRIOR ART)

PROPERTY CONTAINER TYPE OBJECTS

FIELD OF THE INVENTION

The invention relates to a framework being used for developing software system e.g. for a business application, said framework including a number of object oriented classes which may be processed by a computer system.

BACKGROUND

More and more, the software industry uses object oriented technology to develop software for e.g. a business application. For that purpose, object oriented classes are created so that instantiated objects of these classes are able to process the business application on a computer system. Thereby, the instantiated objects are the implementations of the classes and include programming code.

Object oriented technology has the advantage that a software developer is able to work on a specific class or object without the knowledge of the other classes or objects.

For that purpose, a class should be designed such that each instantiated object of the class is a mirror of an object in the real world. E.g., a business partner class should be designed such that each of its instantiated business partner objects relates to one real business partner and that all data concerning this real business partner should be accessible by using this business partner object.

For some time, the software industry has tried to develop standardized classes which may be used again and again for the solution of a specific problem. These classes are then taken together in a so-called framework and are used to develop software systems, e.g. for business applications. This approach has the advantage that the reusability of the developed programming code is increased.

Such frameworks may have for example two levels. In a first level, a framework provider develops general classes which may be adapted to be used in any application. Then, in a second level, a solution provider adapts this framework to a specific application, e.g. to a business application or a warehouse application and so on. This solution is finally used by e.g. an insurance company or a retail company to run its business.

Prior art frameworks often include the business partner class as a base class with one or more additional subclasses. Such subclasses may be e.g. a business partner with shipping zone subclass that adds a shipping zone attribute and a business partner with freight charge subclass that adds a freight charge attribute. As known in object oriented technology, the subclasses derive their characteristics from the base class by inheritance.

In an example, a first application may use a business partner with shipping zone object by instantiating the business partner with shipping zone subclass and a second application may use a business partner with freight charge object by instantiating the business partner with freight charge subclass. By using these objects, the first and the second application are able to process specific functions. In particular, the first application assigns a specific shipping zone to objects of its specific business partner subclass, and the second application adds a specific freight charge to objects of its specific business partner subclass.

However, if the two applications described need to share business partner objects, a problem arises. The first application expects to work with objects of its own specific subclass of business partner, i.e. the business partner with shipping zone subclass. The second application knows nothing of the business partner with shipping zone subclass and will be unable to pass its business partner objects derived from its own business partner with freight charge subclass to any interfaces provided by the first application. Thus it is impossible to share business partner objects between the two applications.

SUMMARY

It is therefore an object of the invention to provide an object oriented technology which prevents the described problem.

The invention solves this problem with a class which provides the ability that specific data may be added to its instantiated object by reference.

In particular, the invention provides an interface and a base class which implements this interface that allows specific data to be added to the objects of classes supporting the interface at runtime without the need for subclassing of the original class. Specific data added in this way to an object are referred to as properties of the object, and the interface introduced by this invention is referred to as the property container interface.

In the case of the above example, the invention only provides a business partner class that supports the property container interface but no subclasses. If an application wants to assign a shipping zone to a specific business partner, the specific data relating to the shipping zone may be added to the business partner object without creating a subclass. As well, if an application wants to calculate a freight charge for a specific business partner, the specific data relating to the freight charge may be added to the business partner object without creating a subclass. Instead, the shipping zone or the freight charge may be assigned to the specific business partner object at runtime as properties.

As well, it is possible that an application adds not only one, but several specific data to the business partner object, i.e. the specific data relating to the shipping zone, the specific data relating to the freight charge, specific data relating to an account code, and so on, without creating any subclass. Instead, these specific data may be assigned to the business partner object as properties.

This has the advantage, that all data relating to a business partner are included or referenced in the respective business partner object. The business partner class has no subclasses so that the data relating to the business partner is not partitioned into different objects. It is therefore possible that an application accesses all data relating to the business partner in the respective business partner object.

Compared to the prior art in which the business partner class is customized by creating subclasses, the invention provides the ability to customize the object of an instantiated class. This has the described advantage that only one business partner object exists for each business partner which includes or references all specific data of this business partner.

DETAILED DESCRIPTION

Figure 1:
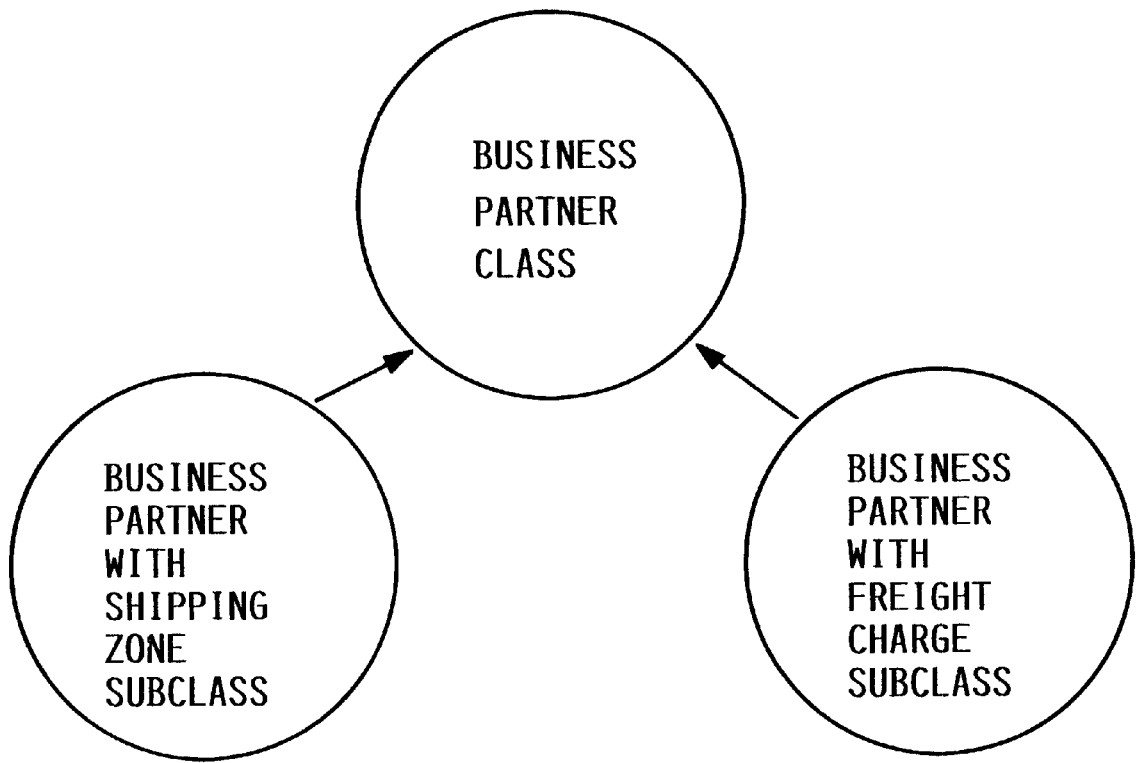
FIG. 1 shows a class diagram with a base class and two subclasses according to the prior art.

FIG. 1 shows a class diagram with a base class and two subclasses according to the prior art. In the example of FIG.

1, the base class is a business partner class and the subclasses are a business partner with shipping zone subclass and a business partner with freight charge subclass. The two subclasses derive their characteristics from the base class by inheritance.

In a business processing environment, corresponding objects may exist from each of these classes. This means that across multiple applications a business partner with shipping zone object and a business partner with freight charge object may exist simultaneously that each represent the same actual business partner and duplicating common data for that business partner subclasses.

If a business application needs access to the shipping zone of a business partner it must require that the business partner be represented with an object of the specific business partner with shipping zone subclass. Likewise, if an application needs access to the freight charge information from a business partner it must require that the business partner be represented by an object of the business partner with fright charge subclass. Thus an object of the business partner with freight charge subclass could never be used in the first case, nor could an object of the business partner with shipping zone subclass be used in the second case. It would be impossible for a business process needing both shipping zone and freight charge information for a business partner to obtain it from any single business partner object.

Figure 2:
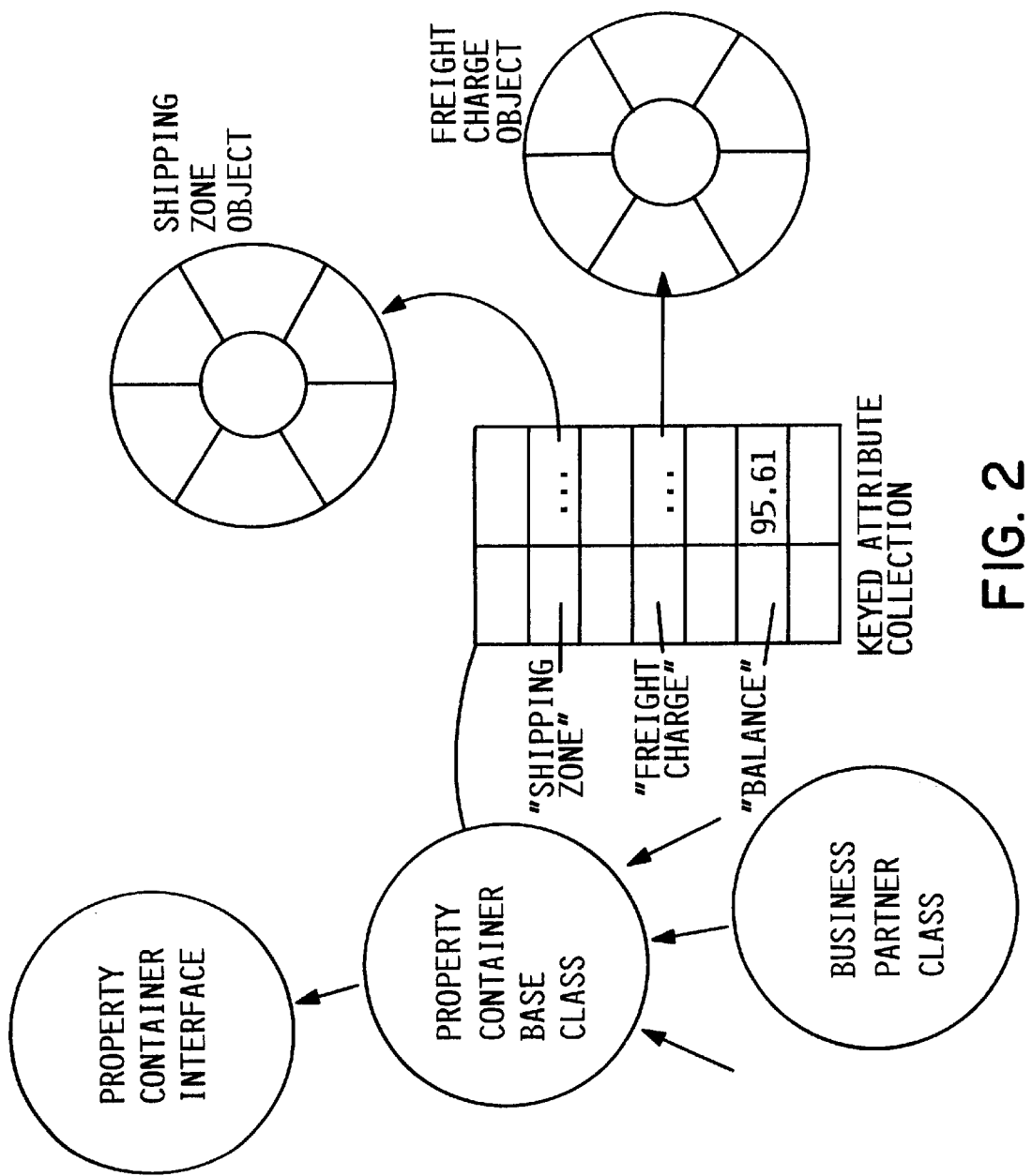
FIG. 2 shows a class diagram with a property container interface and a property container base class according to the invention.

FIG. 2 shows a class diagram with the property container interface and property container base class according to the invention. At least one further class, e.g. a business partner class derives its characteristics from the property container base class by inheritance.

The property container interface introduces a protocol for inserting, accessing and deleting properties from an object of any class supporting the interface. The methods introduced by this interface are as follows:

"addPropertyBy(string propertyName,ObjectReference propertyObject)" This method allows clients of the object to add any object as a property of the property container object and associate with that property the given property name.

"getPropertyBy(string propertyName)" This method returns an object reference to the object representing the contained property associated with the given property name. If no such property exists, an error will be indicated.

"containsProperty(string propertyName)" This method is used to determine if a property container object has a property associated with the given property name.

"removePropertyBy(string propertyName)" This method is used to remove a property associated with a given property name from a property container object.

The property container base class contains a keyed attribute collection. This relationship is shown in FIG. 2. This keyed attribute collection is a dictionary or map style collection that uses strings identifying the properties as keys, e.g. "ShippingZone" as key for the shipping zone property. The values held by the keyed attribute collection are generic references, i.e. pointers to the objects that represent the properties, e.g. the shipping zone object shown in FIG. 2. Properties that are primitive types such as numbers or boolean flags are represented with simple container objects that contain the primitive type and are referenced as objects by the keyed attribute collection.

In the example of FIG. 2, the business partner class derives from the property container base class thus inheriting the interface methods introduced by the property container interface, as well as the keyed attribute collection and the implementation of the methods of the property container interface provided by the property container base class. The result of this inheritance is that the person writing the business partner class will not have to add any code to his class pertaining to properties, the behavior is completely inherited.

Figure 3:
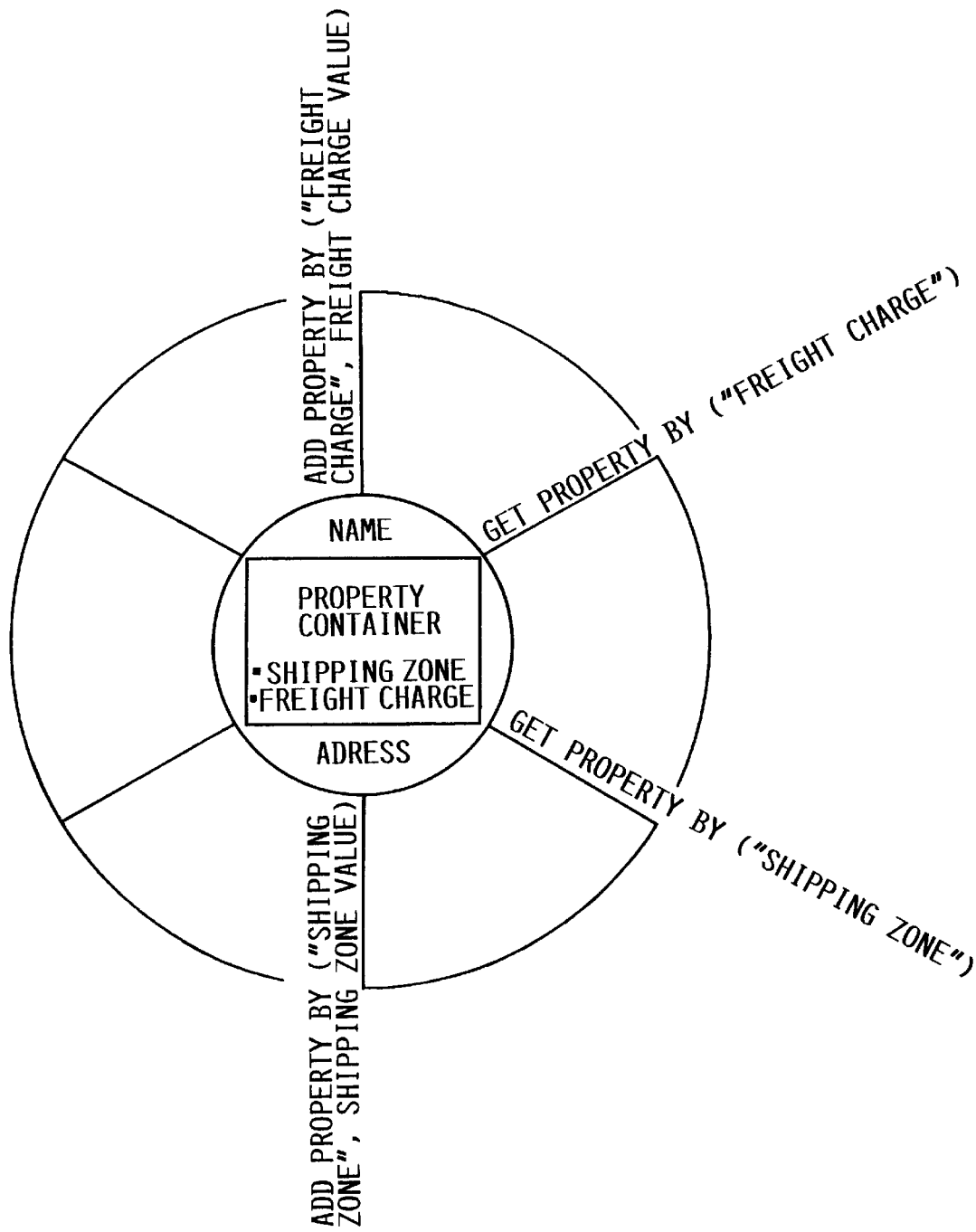
FIG. 3 shows a business partner object according to the invention.

FIG. 3 shows a business partner object according to the invention. This business partner object is the result of an instantiation of the property container base class shown in FIG. 2 for a specific business partner.

The business partner object includes the common data relating to the specified business partner which are from fixed attributes in the business partner class, e.g. name and address. However, the business partner object also contains data items that are not common to all applications but specific to a certain application, e.g. shipping zone and freight charge. These items are kept as properties in the inherited keyed attribute collection contained by the object. The keyed attribute collection is denoted in FIG. 3 by a rectangle called property container.

In the keyed attribute collection of the business partner object shown in FIG. 3, the shipping zone reference and the freight charge reference are included. Of course, it is possible that other or additional references are also included in the property container.

The methods inherited from the property container interface for accessing the properties are shown on the business partner object. The presence of these functions allows the business partner object maintain data items as properties without any real knowledge of the data in the properties. Specific data can then be added to the business partner object as properties by a business application at a later point in time, in particular during the runtime of the business application.

If the first business application wants to process a function, e.g. if the business application wants to assign a shipping zone to a specific business partner, it instantiates the business partner class of FIG. 2 and thereby creates the business partner object of FIG. 3 with some of the data of the specific business partner. Then, the business application adds the shipping zone reference into the property container of the business object in FIG. 3.

With the function "AddPropertyBy("ShippingZone", ShippingZoneValue)" it is then possible for the business application to assign the value of a new specific shipping zone to the respective business partner. The new shipping zone is included in the shipping zone object and is accessible by the function "GetPropertyBy("ShippingZone")" by users of the business partner object.

The same is possible for freight charge information with the functions "AddPropertyBy("FreightCharge", FreightChargeValue)" and "GetPropertyBy ("FreightCharge")".

Now, with the business partner object shown in FIG. 3 it is possible for an application concerned with processing of shipping zones and another concerned with processing of freight charges to use and share the same business partner object without conflict and without either application being aware of the other application's specific properties on the business partner object.

The first application instantiates the business partner class of FIG. 2 and thereby creates the business partner object of FIG. 3 with some of the data of the specific business partner. Then, the business application adds the shipping zone reference. When the new business partner object enters the scope of processing of the second application, the absence of a freight charge property will be detected and an appropriate freight charge property will be added to the object.

With this approach, either application can use the "GetPropertyBy( )" function to access application specific properties on a business partner object regardless of which application the business partner object was originated in. Business partner objects passed from one business application to another retain references to all of their associated properties, regardless of whether the using application has any knowledge of those properties.

The addition e.g. of the shipping zone reference or the freight charge reference into the property container may be done by the business application during the instantiation of the business partner class or later at runtime of the business partner object. The addition has the consequence that the reference to the object, e.g. shipping zone will be added to the keyed attribute collection contained by the business partner object. Later when the property, e.g. shipping zone is accessed, a reference to the object representing that property will be retrieved from the keyed attribute collection.

We claim:

1. A framework used for developing a software system, the framework comprising:

a number of object oriented classes which may be processed by a computer system, said object oriented classes being arranged in a class hierarchy, said object oriented classes including at least one class of a first type, each said class of a first type inheriting from a property container base class which provides the ability that specific data may be added to an instantiated object of a class of said first type by a name; and a keyed attribute collection, wherein the keyed attribute collection is a collection of property names associated with object references, wherein said property container base class has a relationship with the keyed attribute collection, wherein the instantiated object includes the keyed attribute collection, and wherein the keyed attribute collection provides the ability to include the reference to the specific data.

2. The framework of claim 1, wherein each of the references corresponds to one of the specific data.

3. The framework of claim 1, wherein each of the references corresponds to an address.

4. The framework of claim 3, wherein the address points to an object.

5. The framework of claim 4, wherein the object includes the specific data.

6. The framework of claim 1, wherein the reference to the specific data may be included into the keyed attribute collection at runtime.

* * * * *